United States Patent [19]

Jungesjó

[11] Patent Number: 4,545,230

[45] Date of Patent: Oct. 8, 1985

[54] ROTARY FORMING MACHINE HAVING TIE BAR CONNECTION

[75] Inventor: Harald N. Jungesjó, Rochester, Mich.

[73] Assignee: Anderson-Cook, Inc., Fraser, Mich.

[21] Appl. No.: 565,287

[22] Filed: Dec. 27, 1983

[51] Int. Cl.$^4$ ............................................. B21B 31/04
[52] U.S. Cl. ........................................ 72/108; 72/244; 72/462
[58] Field of Search ................. 72/104, 108, 237, 244, 72/462

[56] References Cited

U.S. PATENT DOCUMENTS

| | | | |
|---|---|---|---|
| 2,932,996 | 4/1960 | Yamamoto | 72/104 |
| 3,516,276 | 6/1970 | Bond | 72/237 |
| 4,045,988 | 9/1977 | Anderson | 72/108 |
| 4,322,961 | 4/1982 | Greis | 72/108 |

Primary Examiner—Lowell A. Larson
Attorney, Agent, or Firm—Reising, Ethington, Barnard, Perry & Milton

[57] ABSTRACT

A rotary forming machine assembly including a lower base (12) and a pair of spindle housings (14) including front (16) and rear (18) walls. The housings (14) are movably mounted on the base (12) for movement toward and away from one another. A tool spindle (20) is rotatably mounted between the front (16) and rear (18) walls of each of the housings (14) for rotation about spaced axes (B) to form a workpiece therebetween. The invention includes a deflection control bar (26) extending between and interconnecting the front walls (16) of the spindle housings (14). The control bar (26) limits the distance apart the (B) axes of the tool spindles (20) may move at the front walls (16) in response to the forming of a workpiece (22) between the tool spindles. The control bar is adjustably supported on the front walls (16) for selective movement in a direction parallel to a plane intersecting the axes (B). A dual thickness adjuster member (118) includes a rectangular thickness (148) slidably disposed within a rectangular groove (114) formed in the front walls (10) and a trapezoidal thickness (154) slidably disposed within a recess (112) formed in the control bar.

15 Claims, 4 Drawing Figures

ROTARY FORMING MACHINE HAVING TIE BAR CONNECTION

TECHNICAL FIELD

The subject invention relates to a rotary-forming machine and rotary tool utilized therewith for forming a workpiece. A work spindle rotatably mounts the workpiece about a first axis and a pair of tool spindles which each support a plurality of the tools are each of them rotatably mounted in spindle housings about spaced second axes on opposite sides of the first axis.

BACKGROUND OF THE INVENTION

One type of conventional forming machine incorporates a pair of reciprocal gear tracks having teeth which engage a workpiece causing a forming operation to take place. Machines of this type are disclosed by U.S. Pat. Nos. 3,214,951 and 3,793,866.

Another type of forming machine utilizes rotary-forming tools to form a workpiece. A pair of such tools are rotatably supported in a spaced relationship to each other. The periphery of these tools defines the forming face that engages the workpiece to provide the forming operation. U.S. Pat. Nos. 2,886,990 and 3,201,964 disclose forming machines in which substantially the total 360° periphery of each rotary tool defines its forming face. Consequently, a one to one-half revolution of the tools performs a complete forming operation. However, damage or wear to either of the forming faces on one of the tools requires replacement of the tool even though the other forming face is still usable.

This problem is solved in another type of rotary-forming machine disclosed in U.S. Pat. No. 4,045,988 to the same inventor and assigned to the same assignee herein. This patent discloses rotary tools which are mounted on the tool spindles in a manner that permits any one of the tools to be removed and replaced independently of the other tools. Consequently, if one tool wears or is damaged, it can be replaced without requiring replacement of the other tools. A plurality of rotary tools are mounted on each tool spindle in a circumferentially spaced relationship. Each tool includes a partially circular forming face having forming projections that extend about the associated tool spindle axis for an angle less than 180°. Each tool spindle is rotatably mounted by an associated support housing that is slidably mounted by a slideway on a base of the machine. Between the tool spindle support housings, the work spindle supports a workpiece to be formed such that movement of the support housings toward and away from each other allows workpieces of different sizes to be formed. A problem encountered with this device is that during the forming operation the tool spindles tend to move apart, causing imprecise forming of the workpiece.

STATEMENT OF THE INVENTION

According to the present invention, there is provided a rotary-forming machine assembly including a lower base, a pair of spindle housings each including front and rear walls and movably mounted on the base for movement toward and away from one another. A tool spindle is mounted between the front and rear walls of each of the housings and are rotatably supported by the walls thereof for rotation about spaced axes for forming a workpiece therebetween. The invention is characterized by a deflection control bar extending between and interconnecting the front walls of the spindle housings for limiting the distance apart that the axes of said tool spindles at the front walls may move in response to the forming of a workpiece between the tool spindles.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
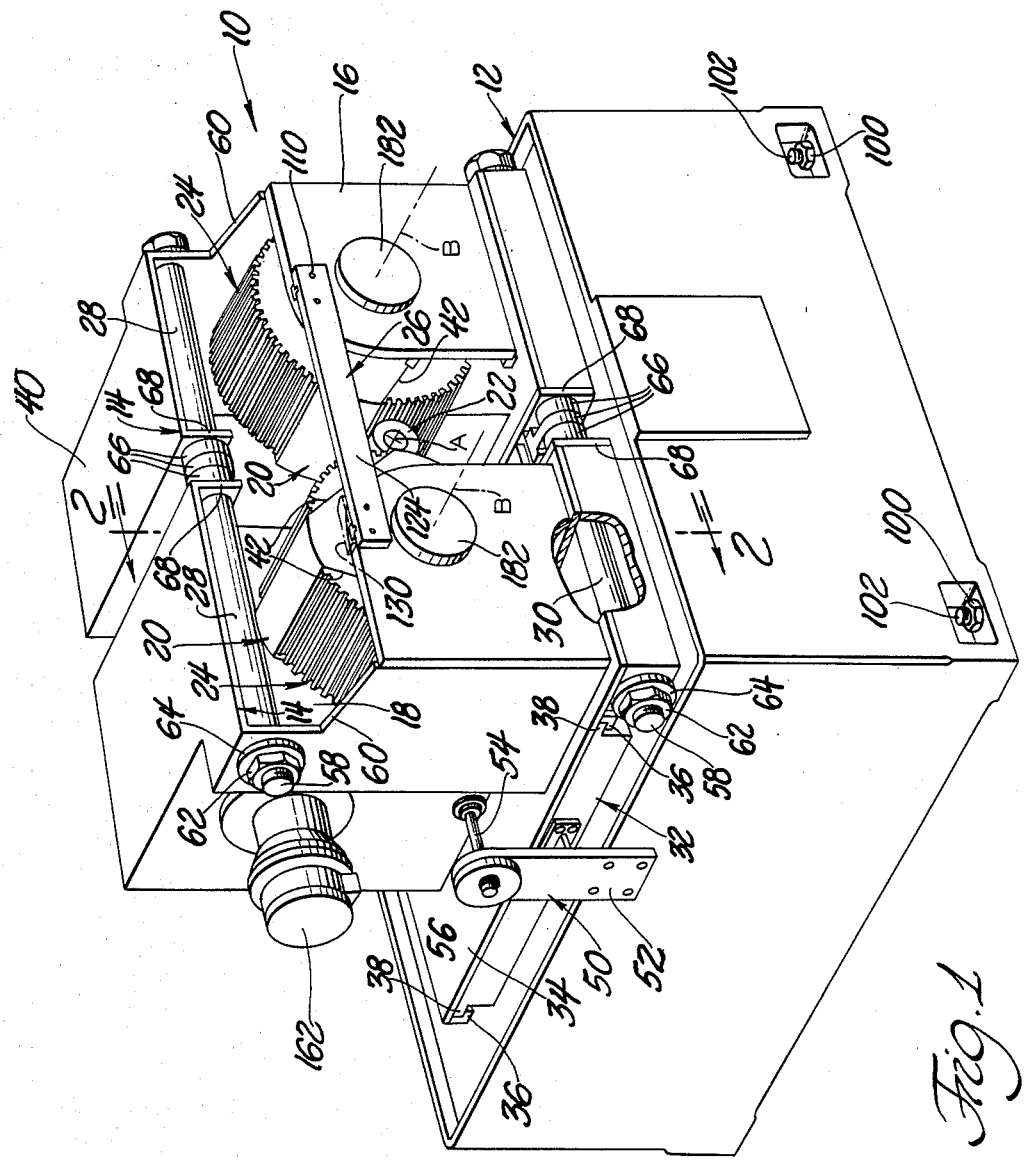
FIG. 1 is a perspective view of the subject invention.

A rotary-forming machine assembly of the type for performing a gear-splining operation is generally shown at 10 in FIG. 1. As shown in FIG. 1, the assembly 10 includes a lower base generally indicated at 12, a pair of spindle housings 14 each including front 16 and rear 18 walls. The housings 14 are movably mounted on the base 12 for movement toward and away from one another. A tool spindle 20 is mounted between the front 16 and rear 18 walls of each of the housings 14 with the tool spindles 20 being rotatably supported by the walls 16, 18 for rotation about spaced axes B for forming a workpiece 22 rotating about an axis A. Each tool spindle 20 includes a rotary tool 24. A deflection control bar generally indicated at 26 extends between and interconnects the front walls 16 of spindle housings 14. The control bar 26 functions to limit the distance apart that the B axes of the tool spindles 20 may move apart in response to the forming of a workpiece 22 between the tool spindles 20.

There is also provided additional tie bar connectors 28, 30 for further limiting the distance apart that the two B axes may move apart. As aforesaid, the problem when only the two tie bars 28 and 30 are utilized, is that the B axes at the front walls 16 of the housing 14 tend to move apart during the splining operation notwithstanding the two tie bar connectors 28, 30 positioned at the upper rear of the housing 14 and at the front of the base 12. Accordingly, the deflection control bar 26 at the front walls 16 of the housing 14 limits the distance apart that the two axes B may move in response to the splining operation being performed on a workpiece 22. Therefore, the instant invention maintains the precision of the gear-forming operation vis-a-vis the exact spacing of the B axes.

With reference to FIG. 1, the base 12 has a slideway generally indicated at 32 on which the support housings 14 are mounted for slidable movement toward and away from each other. Each support housing 14 includes a base plate 34 which slides on the slideway 32 and has downwardly depending flanges 36 opposing each other and slidably engaging the respective edge strips or rails 38 of the slideway 32.

Figure 4:
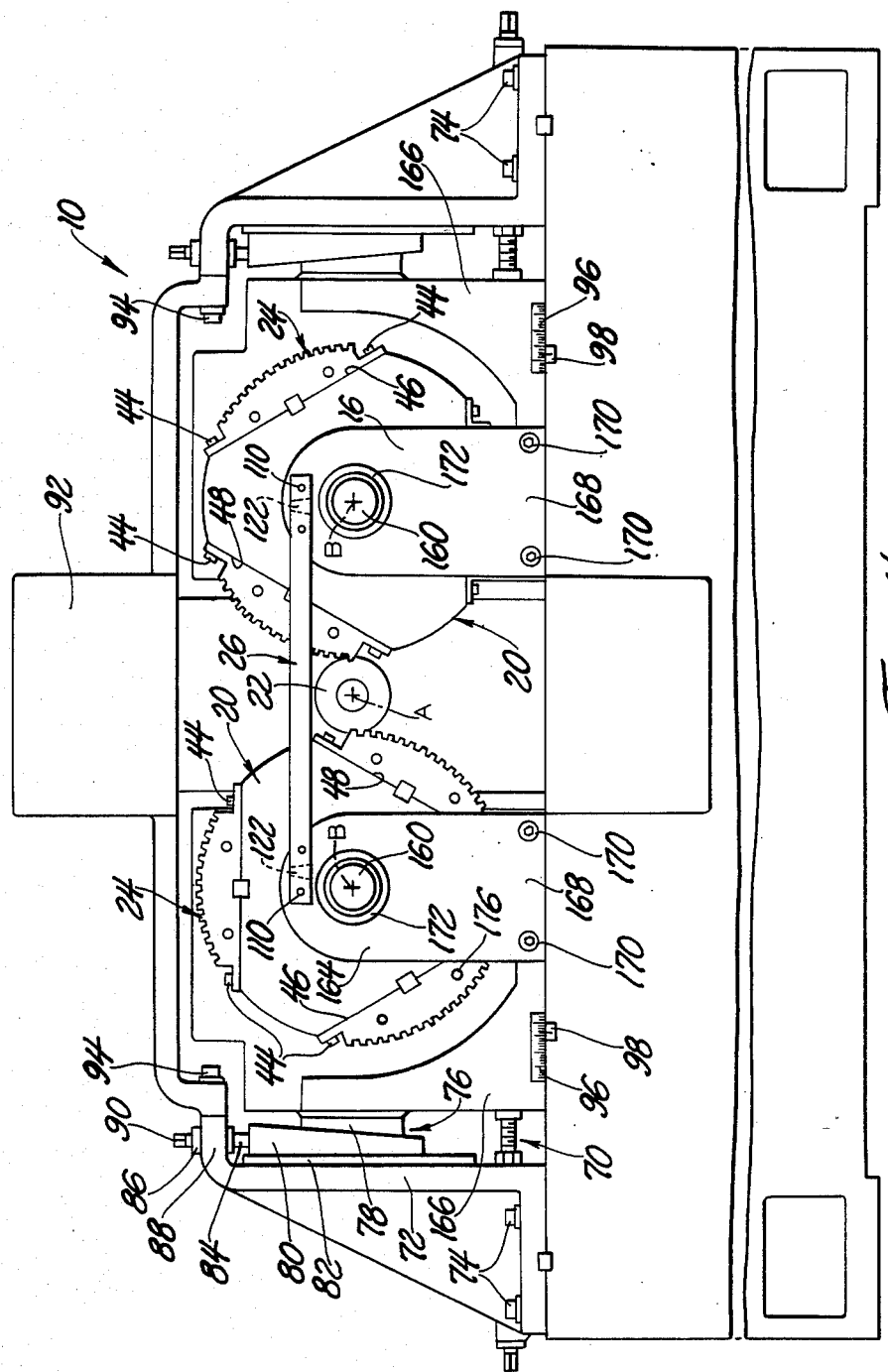
FIG. 4 is an elevational view showing a rotary-forming machine and associated rotary forming tools with the control bar of the subject invention.

The housings 14 include hollow box-like portions 40 with front and rear walls 16 and 18 for supporting the tool spindles 20. Each tool spindle 20 has three flat mounting surfaces 42 oriented in a radial direction with respect to the associated shaft and spaced circumferentially thereabout in an equally spaced relationship. Tools 24 are mounted on each mounting surface 42 by attachment members 44 (as shown in FIG. 4) so that the tool mounting surfaces 46 engage those of the tool spindles. Spindle mounting surface projections 48 are received within openings in the tool mounting surfaces 46 to locate the tools in cooperation with attachment members 44.

With reference to FIG. 1, each support housing 14 includes an adjustment mechanism generally indicated at 50 (only one shown) having a plate 52 mounted on the base 12 and a shaft 54 with an outer hexagonal end 56 mounted by the plate. An inner end of shaft 54 is threaded and received by a fixed nut of the associated support housing so that rotation of the shaft moves the support housing toward and away from the other support housing. Each support housing can thus be adjusted so that the tool spindle 20 can be adjusted with respect to the workpiece axis A to form different sized parts. After the support housings 14 have been adjusted to the proper location, a pair of tension members 28, 30 prevent movement of the housings away from each other providing precise forming.

Each tension member 28, 30 has an elongated configuration with a pair of threaded ends 58 extending outwardly past a side plate 60 of the adjacent support housing. Nuts 62 and associated washers 64 are disposed on the threaded tension member ends 58 and engage the housing side plates 60. Apertured spacers 66 of appropriate thicknesses are sandwiched between housing flanges 68 of the housings 14 with intermediate portions of tension members 28, 30 extending through the spacers 16. Tightening of nuts 62 compresses the spacers 66 and tensions members 28, 30 with a preload to prevent outward movement of the tool spindles 20. One of the tension members 28 is located above the tool spindles 20 and the other 30 is located below the tool spindles 20. As aforesaid, the adjustment mechanism 50 and cooperating tension members 28, 30 do not entirely prevent the movement apart of the B axes adjacent the front walls 16 during the forming of a workpiece 22 on the work spindle. As wil be appreciated, the instant invention utilizes a deflection control bar 26 to entirely prevent the movement apart of the two B axes during the forming of a workpiece.

A variation of the assembly is shown in FIG. 4. In this assembly, adjustable nut and bolt assemblies 70 provide the adjustment for moving the tool spindle support housing 14 toward and away from the work spindle. These nut and bolt assemblies extend between the housings 14 and associated brackets 72 mounted on the machine base 12 by bolts 74. Adjustable wedge-block assemblies generally indicated at 76 also extend between the brackets 72 and the housings 14 to provide reinforcement for the positioning of the tool spindle housings 14 during the forming operation performed by the machine. Each wedge block assembly 76 includes a wedge block 78 fixedly mounted on the associated housing 14 by one or more bolts (not shown), and an adjustable wedge block 80 engaged with the wedge block 78 and slidably movable between the side flanges 82 on the adjacent bracket 72. The upper end of each adjustable wedge block 80 is connected to a threaded shaft 84, received within a threaded bearing 86 mounted on an upper flange 88 of the associated bracket 72. The upper end 90 of the shafts 84 receive a suitable wrench for rotating the shafts and thereby moving the adjustable wedge blocks 80 vertically. This vertical movement allows the wedge block assemblies to position and reinforce the positioning of the housings 14 in any adjusted position against outward movement away from each other during the forming operation of the machine. A common brace 92 is secured to the flanges 88 of the brackets 72 by bolts 94 so as to maintain the brackets 72 against deflection that could cause movement of the tool spindles. Also, each of the tool spindle housings 14 carries a scale 96, which is aligned with a visually observable mark 98 on the machine base 12 to position the tool spindles for performing the forming operation on workpieces of a predetermined size. The machine base 12 is further stabliized by nuts 100 and bolts 102.

Figure 3:
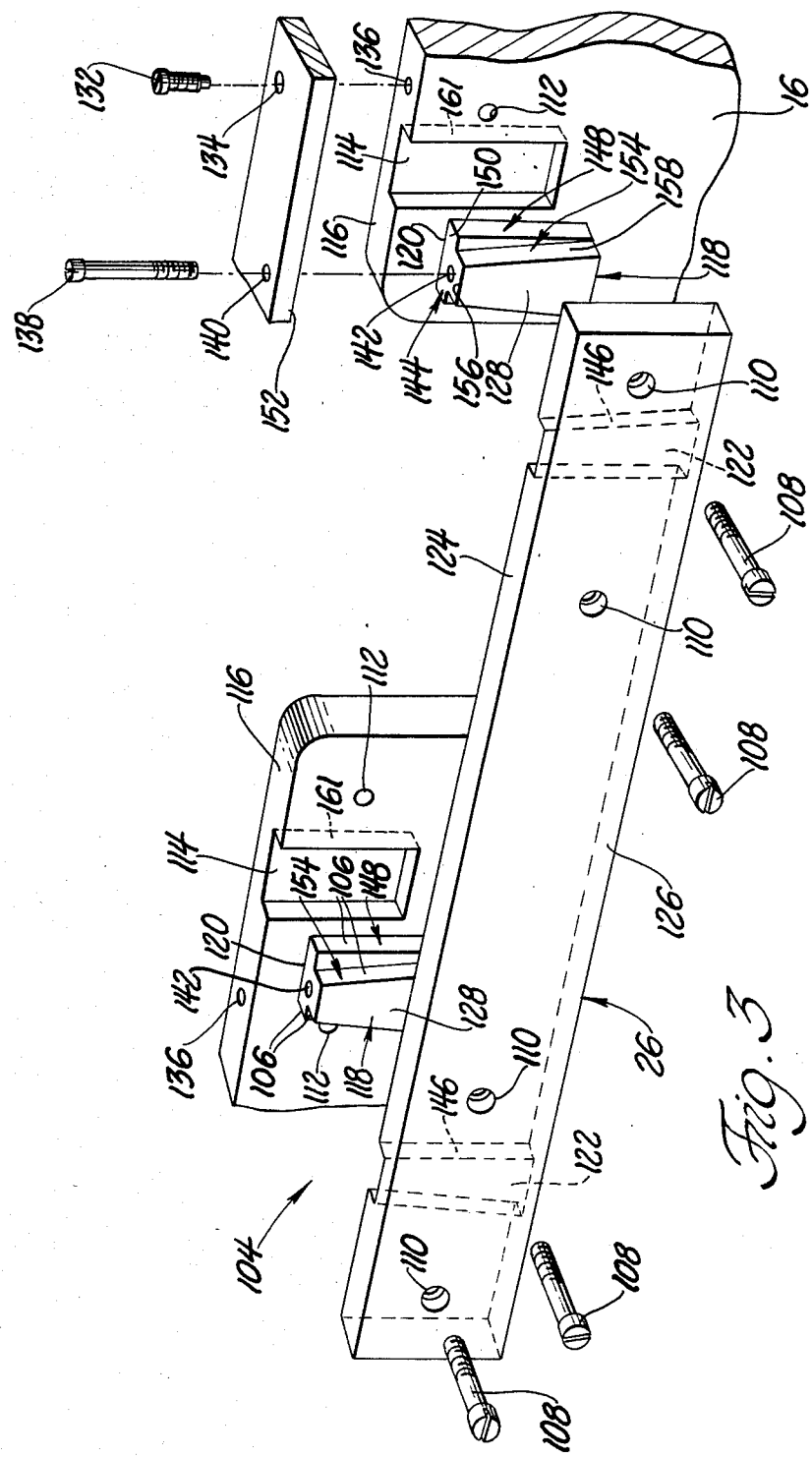
FIG. 3 is an enlarged, exploded perspective view of components of the control bar of the subject invention.

With reference to FIG. 3, there is provided abutment means generally shown at 104 presenting abutment surfaces 106 (the rear surface) connecting each of the front walls 16 and the control bar 26 for being urged into abutting engagement with one another in response to forces causing the two B axes to move apart during operation of the machine 10. Relative movement is selectively allowed between the control bar 26 and the front walls 16 in the direction parallel to a plane intersecting the two B axes of the spindles. The deflection control bar 26 has a plurality of bolts 108, each respectively passing through a plurality of slots 110 and comprising adjustable support means. The slots 110 are elongated and longer in a direction parallel to the plane intersecting the two B axes. The slots 110 are formed in the control bar 26 and align with threaded holes 112 in the front walls 16. The bolts 108 pass through the elongated slots 110 and threadedly engage the holes 112 so that once the bolts 108 are positioned in the slots 110 as desired, the bolts may then be tightened to thereby secure the control bar 26 in a fixed position. Abutment means 104 includes a generally rectangular groove 114 formed in each of the front walls 16 and extending into the top edge 116 of the front walls and running perpendicular to the plane intersecting the two B axes. There is also provided a movable adjuster member generally indicated at 118 having one side or rear face 120 slidably disposed in each of the grooves 114. A recess 112 is formed at each end of the control bar 26 extending between the top 124 and bottom 126 edges and perpendicular to the longitudinal axis of the control bar 26 for receiving the opposite side 128 of one of the adjuster members 118. A plate generally indicated at 130 is affixed to the top edge 116 of each of the front walls 16 by bolts 132 passing through apertures 134 in the plate 120 and threadedly engaging the holes 136 provided in the top edge 116 of the front wall 16. In this manner, the plate 130 is secured in overlying spaced relation to the adjuster member 118 for adjusting the distance between the adjuster member 118 and the plate 130. More specifically, the distance between the plate 130 and the adjuster member 118 may be varied by means of an adjustment screw 138 passing through an aperture 140 in the plate 130 and within the rectangular groove 114 for threaded engagement with an aperture 142 provided in the top 144 of the adjuster member 118. Hence, the adjuster member 118 may be raised or lowered in response to lateral adjustments in the abutment means 106 of the control bar 26.

As described above, lateral adjustment of the abutment means 104 in a direction parallel to the longitudinal axis of the control bar 26, is accompanied by adjustment of the adjuster member 118 within the rectangular groove 114. Adjustment of the adjuster member 118 is characterized by a wedging action whereby the adjuster member 118 is wedged against a complementary interior wall 146 (shown in phantom) of the recess 112 in the control bar 26 in responses to forces urging the two B axes apart.

As shown in FIG. 3, each of the adjuster members 118 comprises a dual thickness block. A first thickness generally indicated at 148 of generally rectangular cross section has a top face 150 spaced from the underside 152 of the plate 130 for movement of the first thickness 148 within the rectangular groove 114. A second thickness generally indicated at 154 is of generally trapezoidal cross section and includes a top face 156 spaced from the underside 152 of the plate 130 and is provided with the threaded aperture 142 for threadedly engaging the adjustment screw 138 as hereinabove described. More specifically, the second thickness 154 includes one sloped side wall 158 which is nonperpendicular to the top face 156 for wedging contact with a complementarily sloped interior wall 146 (shown in phantom) in the control bar. It will again be appreciated that the wedging action of the sloped side wall 158 against the complementarily sloped interior wall 146 as described above takes place in response to vertical adjustment of the adjuster blocks 118 to place the control bar 26 in tension to prevent the B axes from moving apart.

A spur gear train (not shown) extends between the two tool spindle shafts 160 to synchronize the rotation of each with the other. It is also possible to utilize a worm gear drive train (also not shown) to drive the tool spindles 20 in a coordinated manner with each other. The worm gear drive train would include a pair of shafts respectively supported for rotation on the support housings 14 (FIG. 1 in a suitable manner with their outer ends driven by an associated hydraulic moter 162 (FIG. 1). A specific type of worm gear drive set referred to as being "double enveloping" provides area contact in driving the tool spindle shafts 186 so as to rotate the spindles to form the workpiece. It has been found that this type of drive will give precise formula workpieces formed by the machine vis-a-vis the coordinated rotation of each tool spindle 20 with the other tool spindle.

A work spindle timing gear drive includes an input shaft driven by one of the worm gears of the drive set in a coaxial relationship with the associated tool spindle shaft 160.

The above timing, worm and spur gear drives are of the type well-known in the art and disclosed in the aforementioned U.S. Pat. No. 4,045,988.

Each tool spindle 20 is rotatably mounted on the machine base 12 by an associated shaft 160 of its respective support housing 164. Each support housing 164 includes a main portion 166 and an upwardly extending portion 168 that is secured to the main portion by bolts 170. The housing portions 166 and 168 are oriented in a horizontally spaced relationship and respectively support anti-friction bearing assemblies (not shown) that cooperatively rotatably mount the associated tool spindle shaft 160. Intermediate these housing portions 166 and 168, the shaft 160 is received within a central opening of the associated tool spindle 20 which is rotatably fixed thereto by keys or the like. Adjacent their outer ends the shafts 160 each include a reduced diameter portion (FIG. 2) that is received within the associated bearing assembly located by plates 172 within a suitable aperture in the housing portion 168.

Figure 2:
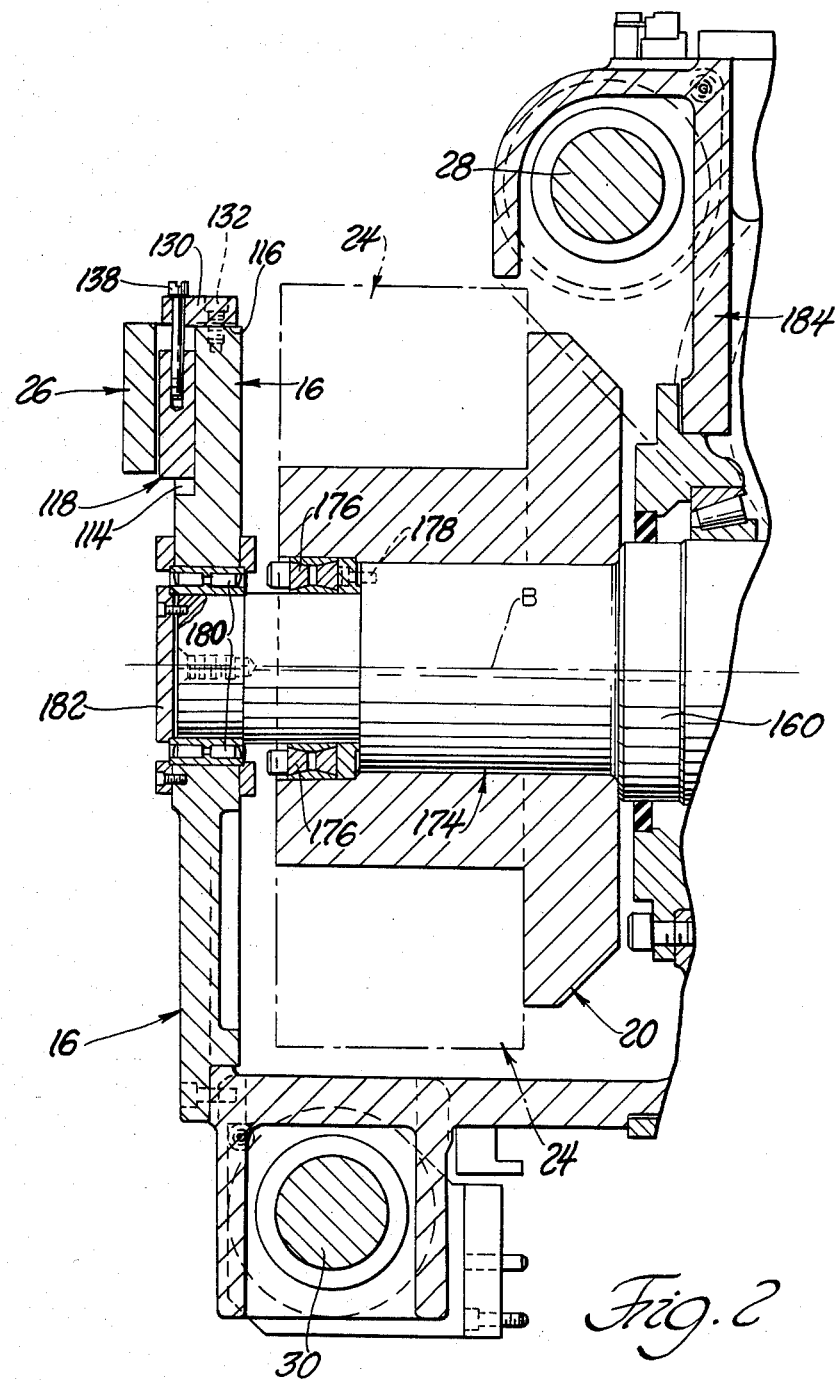
FIG. 2 is a cross-sectional view taken substantially along lines 2—2 of FIG. 1.

With reference to FIG. 2, the tension members 28 and 30 are shown in cross section. A tool spindle 20 is driven by the shaft 160 which has a reduced diameter portion generally indicated at 174. The tools 24 are positioned on the spindles 20 as shown. A locking assembly 176 is mounted on the end portion 178 of the shaft 160. Bearings 180 are adjacent the cap 182 of the shaft 160. The support structure is generally indicated at 184 and shown elsewhere in FIGS. 1 and 4.

With continuing reference to FIG. 2, there is shown the deflection control bar 26, the adjuster member 118, the front wall 16 and the plate 130. Also shown is the fastener 132 affixing the plate 130 to the top edge 116; of the front wall 16 and the adjustment screw 138 which raises and lowers the adjuster member 118 relative to the plate 130 and within the rectangular groove 114.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A rotary-forming machine assembly comprising:
a lower base (12); a pair of spindle housings (14) including front (16) and rear (18) walls, said housings (14) movably mounted on the base (12) for movement toward and away from one another; a tool spindle (20) mounted between said front (16) and rear (18) walls of each of said housings (14), said tool spindles (20) rotatably supported by said walls (16, 18) for rotation about spaced axes (B) for forming a workpiece (22) therebetween including a tie bar connector (28) extending between and interconnecting said rear walls (18) and limiting the distance apart said rear walls (18) may move in response to the forming of a workpiece between said tool spindles (20); characterized by a deflection control bar (26) extending between and interconnecting said front walls (16) of said spindle housings (14) only for limiting the distance apart said axes (B) of said tool spindles (20) may move at said front walls (16), in response to the forming of a workpiece between said tool spindles (20).

2. An assembly as set forth in claim 1 further characterized by said deflection control bar (26) including adjustment means for adjusting the length of said limiting distance between said axes (B) at said front walls (16) only.

3. An assembly as set forth in claim 2 further characterized by said deflection control bar (26) including abutment means (104) presenting abutment surfaces (106) interconnecting each of said front walls (16) and said control bar (26) for being urged into abutting engagement with one another in response to forces causing said two axes (B) to move apart at said front walls (16) only.

4. A rotary-forming machine assembly comprising:
a lower base (12); a pair of spindle housings (14) including front (16) and rear (18) walls, said housings (14) movably mounted on the base (12) for movement toward and away from one another; a tool spindle (20) mounted between said front (16) and rear (18) walls of each of said housings (14), said tool spindles (20) rotatably supported by said walls (16, 18) for rotation about spaced axes (B) for forming a workpiece (22) therebetween; characterized by a deflection control bar (26) extending between and interconnecting said front walls (16) of said spindle housings (14) for limiting the distance apart said axes (B) of said tool spindles (20) may move at said front walls (16) in response to the forming of a workpiece between said tool spindles (20); adjustment means for adjusting the length of said limiting distance between said axes (B); abutment means (104) presenting abutment surfaces (106) interconnecting each of said front walls (16) and said control bar (26) for being urged into abutting engagement with one another in response to forces causing said two axes (B) to move apart; and adjustable support means for supporting said control bar (26) on said front walls (16) and for selectively allowing relative movement between said control bar (26) and said front walls (16) in a direction parallel to a plane intersecting said axes (B).

5. An assembly as set forth in claim 4 further characterized by said adjustable support means comprising a plurality of bolts (108) each respectively passing through a plurality of slots (110) formed in said control bar (26) and threadedly engaging said front walls (16).

6. An assembly as set forth in claim 3 further characterized by said abutment means (104) comprising:

a generally rectangular groove (114) formed in each of said front walls (16), said rectangular groove (114) extending into the top edge (116) of said walls (16) and running perpendicular thereto; a movable adjuster member (118) having one side (120) slidably disposed in each of said grooves (114); a recess (112) formed at each end of said control bar (26) and extending between the top (124) and bottom (126) edges thereof and perpendicular to the longitudinal axis of said control bar (26) for receiving the opposite side (128) of one of said adjuster members (118); a plate (130) affixed to the top edge (116) of each of said front walls (16) and adjustably secured in spaced relation to said adjuster member (118) for adjusting the distance between the adjuster member (118) and said plate (130).

7. An assembly as set forth in claim 6 further characterized by an adjustment screw (138) passing through said plate (130) and within said rectangular groove (114) for threaded engagement with said adjuster member (118) whereby said adjuster member (118) may be raised or lowered.

8. An assembly as set forth in claim 7 further characterized by wedging means for wedging said adjuster member (118) against a complementary interior wall (146) of said recess (112) in said control bar (26) to place said control bar in tension to prevent said axes (B) from moving apart.

9. An assembly as set forth in claim 8 further characterized by each of said adjuster members (118) comprising a dual thickness block including:

a first thickness (148) of generally rectangular cross section, having a top face (150) spaced from the underside (152) of said plate (130) for movement within said rectangular groove (114) in said front wall (16) and a second thickness (154) of generally trapezoidal cross section having a top face (156) spaced from the underside (152) of said plate (130) and provided with a threaded aperture (142) for threadedly engaging said adjustment screw (138), said second thickness (156) including one sloped side wall (158) nonperpendicular to said top face (156) for wedging contact with a complementarily sloped interior wall (160) of said groove (114) in said control bar (26) in response to forces urging said two axes (B) apart.

10. An assembly as set forth in claim 9 further characterized by said tool spindles having a plurality of rotary tools (24) associated with each tool spindle (20).

11. An assembly as set forth in claim 10 further characterized by a work spindle (22) for mounting the workpiece and positioned between said tool spindles (20) for performing a splining operation on said workpiece.

12. An assembly as set forth in claim 11 further characterized by a gear train synchronizing the rotation of each tool spindle (20) with the other tool spindle; and timing means for driving the work spindle (22) in coordination with the tool spindles.

13. An assembly as set forth in claim 12 further characterized by a pair of adjustable tension members (28, 30) extending between the tool spindle housings (14) with the tool spindles (20) therebetween to prevent movement of the tool spindles away from each other during forming of a workpiece.

14. An assembly as set forth in claim 12 further characterized by said gear train including a double-enveloping worm gear drive train for driving said tool spindles (20) in a coordinated manner with each other and a timing gear drive for driving said work spindle (22) in coordination with said tool spindles.

15. An assembly as set forth in claim 12 further characterized by drive means for driving said tool spindles including a pair of electric motors whose rotation is coordinated by a spur gear drive.

* * * * *